Patented Dec. 12, 1922.

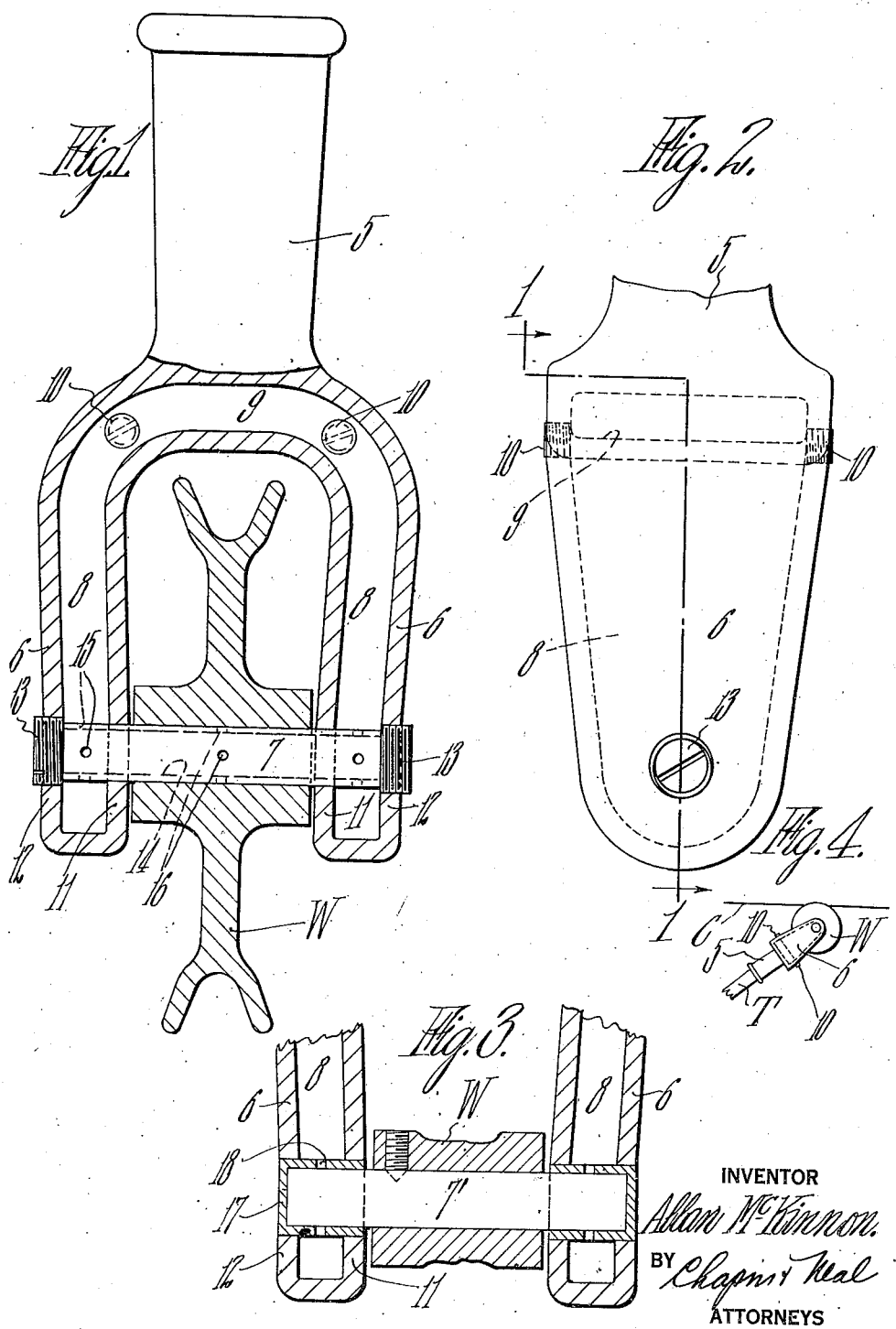

1,438,251

UNITED STATES PATENT OFFICE.

ALLAN McKINNON, OF HOLYOKE, MASSACHUSETTS, ASSIGNOR TO McKINNON VACUUM TROLLEY HARP COMPANY, OF HOLYOKE, MASSACHUSETTS, A CORPORATION OF MASSACHUSETTS.

TROLLEY HEAD.

Application filed January 21, 1921. Serial No. 438,919.

*To all whom it may concern:*

Be it known that I, ALLAN McKINNON, citizen of the United States, residing at Holyoke, in the county of Hampden and State of Massachusetts, have invented new and useful Improvements in Trolley Heads, of which the following is a specification.

This invention relates to improvements in trolley heads, or, as they are frequently termed, trolley harps or forks.

The object of the invention is to provide a relatively simple and inexpensive yet efficient self-oiling trolley head.

Another object of the invention is to provide a self-oiling trolley head which, externally considered, is practically like all other trolley heads and entirely free from projections and protuberances which are likely to catch on the trolley wire when the trolley pole is being manipulated to engage the wheel with the trolley wire.

Other objects and advantages will appear in the following description and in the illustrative embodiment of the invention in the accompanying drawings, in which—

Fig. 1 is a sectional view of a trolley head and spindle, embodying the invention and taken along the line 1—1 of Fig. 2;

Fig. 2 is an end elevational view thereof;

Fig. 3 is a fragmentary view, taken similarly to Fig. 1 and showing a modification of the invention; and Fig. 4 is a fragmentary small-scale view showing the position of the trolley head when in active service.

Referring to these drawings: the trolley head, or as it is sometimes called the trolley harp or fork, is of usual exterior form, having a lower socket portion 5 for attachment to the trolley pole T and an upper bifurcated portion which affords two spaced arms 6. Between the latter, a trolley wheel W, of any suitable type, rotates, being supported on a spindle 7, which in turn is supported at its ends in the arms 6.

A feature of the invention is that the arms 6 are made hollow to provide reservoirs 8 for the reception of lubricant to be supplied to the spindle 7. Preferably, although not necessary, reservoirs 8 are connected, as shown, at their bases by a passage 9, as this construction permits both reservoirs to be supplied at the same time through a single filling opening and permits an equal distribution of the lubricant in each reservoir 8.

In order to provide for filling the reservoirs, a removable screw 10 is provided at the base of each reservoir, which screw, when removed, allows access to the reservoirs. Preferably, these screws are provided on each side of the arms for the following reason. The filling is usually accomplished when the trolley pole T is pulled down from the wire C and one of the screws 10 (see Fig. 4) will be inaccessible at this time. When the trolley is swung around and pulled down from the opposite end of the car the other screw 10, shown in Fig. 4, will be rendered inaccessible. Obviously, when the connecting passage 9 is used the screws 10 need not be duplicated on the same side of the head, as shown.

The inner wall 11 of each arm 6 is bored to receive and closely fit the trolley spindle 7 and the outer walls 12 are provided with openings through which the spindle may be freely and readily inserted. The last-named openings are closed by set screws 13 which abut the ends of spindle 7 and hold it against endwise movement. The screws 13 likewise serve to clamp the spindle 7 and prevent rotation thereof.

The wheel W is preferably mounted for free rotation on the spindle, although, as will appear, the spindle may rotate, if desired. When the wheel rotates on the spindle, the latter is made hollow or tubular, having an axial passage 14. The latter, however, is closed at its ends by screws 13, and in order to permit lubricant from the reservoirs to reach passage 14, one or more openings 15 are provided in the peripheral wall of the passage 14 near each end to communicate with the adjacent reservoir 8. That portion of spindle 7 underlying wheel W is also provided with one or more openings 16 which permits lubricant from passage 14 to reach the bearing surfaces of the wheel and spindle.

While the spindle 7 may, if desired, rotate by backing off the screws 13, the preferred construction for this purpose is shown in Fig. 3. As there shown, the spindle 7' is fixed to the wheel W and the spindle may if desired, be solid. The principal structural difference over the form shown in Fig. 1 is that the openings in arms 11 and 12 are made equal in size and larger than the spindle and bushings 17, preferably closed at their outer ends, are driven into these openings to serve as bearings for the ends of spindle 7'. One or more openings 18 are provided in each bushing to permit lubricant from reservoirs 8 to reach the bearing surfaces of the bushings and the spindle.

Figures 1, 2 and 3 are intended to show the structural features of the trolley head and do not show it in its normal operative position, such position being shown in Fig. 4.

In operation, suitable lubricant is supplied to reservoirs 8 to any desired level. The level of lubricant in the reservoirs need not reach to the passage 14, for the vibration of the trolley pole T when in actual service is sufficient to throw lubricant upwardly through holes 15 (or 18) and into the passage 14.

The invention has been disclosed herein, in an embodiment at present preferred, for illustrative purposes, but the scope of the invention is defined by the appended claims rather than by the foregoing description.

What I claim is—

1. In combination, a trolley head having a socket portion for the reception of the trolley pole and two spaced arms to receive therebetween the trolley wheel, each of said arms being hollow to afford lubricant-containing reservoirs, a spindle for the trolley wheel mounted in and extending between said arms and in communication with the reservoir in each, the trolley head having also a filling opening provided at opposite sides of the head and adjacent said socket portion so that the reservoirs may be conveniently filled when the trolley is pulled down from either end of the car, and removable means normally closing said openings.

2. In combination, a trolley head having two spaced arms between which the wheel is mounted, each of said arms being hollow to afford reservoirs for lubricant, a hollow spindle, extending between said arms to support the wheel and through the inner walls of said hollow arm, screws threaded through the outer walls of said hollow arm to abut and close the adjacent open end of the spindle and hold it against endwise movement, means provided to permit communication between the reservoir in each arm and the interior of the spindle, and means provided in the latter to permit communication between the interior of the spindle and the bearing surface of the wheel.

In testimony whereof I have affixed my signature.

ALLAN McKINNON.